United States Patent [19]

Lin

[11] Patent Number: 5,717,427
[45] Date of Patent: Feb. 10, 1998

[54] OPTICAL-REFLECTING DECODER MODULAR DESIGN MECHANISM OF MOUSE

[75] Inventor: Chia-Hui Lin, Hsin Tien, Taiwan

[73] Assignee: Sysgration Ltd., Hsin Tien, Taiwan

[21] Appl. No.: 506,959

[22] Filed: Jul. 28, 1995

[51] Int. Cl.⁶ ............................................. G09G 5/08
[52] U.S. Cl. ........................................ 345/163; 345/164
[58] Field of Search ............................... 345/156, 157, 345/163, 164, 165, 166; 471/74 XY; 273/148 B; 341/20, 21, 22; 411/508, 509, 510, 513

[56] References Cited

U.S. PATENT DOCUMENTS 4,739,315  4/1988  Soma et al. ........................ 345/156
5,144,290  9/1992  Honda et al. ...................... 345/156
5,311,209  5/1994  Lin ................................... 345/164

Primary Examiner—Chanh Nguyen
Attorney, Agent, or Firm—Bacon & Thomas

[57] ABSTRACT

An optical-reflecting decoder modular design mechanism of mouse which is all components of mouse control circuit to adhere to the PCB using SMT technic, and this PCB is installed on a base which has two small size slotted discs, one ball member and one idle roller. Besides, the end of mouse cable has a connector which has several slots on the top center, and each slot has a connecting spring, and at the end of each spring has a connecting protuberance in order to touch to the touching point of the PCB. Also two sets of LED and phototransistors are adhered to the back of PCB, and installed reflecting lens under each LED and phototransistor, and install on the rack of two lens in a proper slope angle for light reflection.

4 Claims, 6 Drawing Sheets

OPTICAL-REFLECTING DECODER MODULAR DESIGN MECHANISM OF MOUSE

BACKGROUND OF THE INVENTION

1. Field of the invention

The prevent invention is an optical-reflecting decoder modular design mechanism for mouse which is to make the circuit and coding structure of an optomechanical mouse into a smaller size and to put on a base in order to fit into different shapes of mouse casing; such as mechanism of watch can put into different design of watch casing.

2. Description of the prior art

Currently, the circuit and mechanism of conventional mice (optomechanical) are very similar, but the appearance design (or casing design) of mouse is multifarious to attract more consumers. However, mouse has to re-design the circuit and mechanism to fit the casing design; thus makes the cost of development and design too high and wastes the resource. If there is a design of mouse circuit and mechanism which can be used in different design of casing, then should save developing cost and reduce the waste of resource.

As shown in FIG. 1 is an exploded view of conventional mouse; the conventional mouse are differentiated by different brand, and also the mouse structures are very complicated. Using my previous invention of U.S. Pat. No. 5,311,209, the mouse structure as an example for illustration, an assembled optomechanical mouse should include a case (10), a control circuit (11), an optical mechanism (12) and one ball member (13) etc. The case (10) should be composed by bottom casing (14), the top casing (15), and one or more buttons on the top casing (16). The front of control circuit (11) has two or three touching switches (17), and on the end of control circuit (11) is a photoelectric set (12) which is composed two sets of LED, double-chip phototransistor, and two slot discs (18). The ball member (13) is fixed by a ball cover (19) on the bottom casing (15), and one idle roller prop up tightly close to the slotted discs (18). The top casing (14) and bottom casing (15) are locked by one or several screws (21) and the bottom of bottom casing (15) has one to four pads (22).

According to above structure, we can conclude that no matter what change of mouse casing, the five major components; control circuit (11), photoelectric set (12), slotted discs (18), ball member (13) and idle roller (20) will not change. The present invention uses these five components to form a mechanism module of a mouse.

SUMMARY OF THE INVENTION

The main purpose of present invention is to provide the major components of a conventional mouse, and using modular design theory to shrink the size of all components to put on the base (later call mechanism); thus it can be installed into different mouse casings, thus can save developing cost and prevent resource waste.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
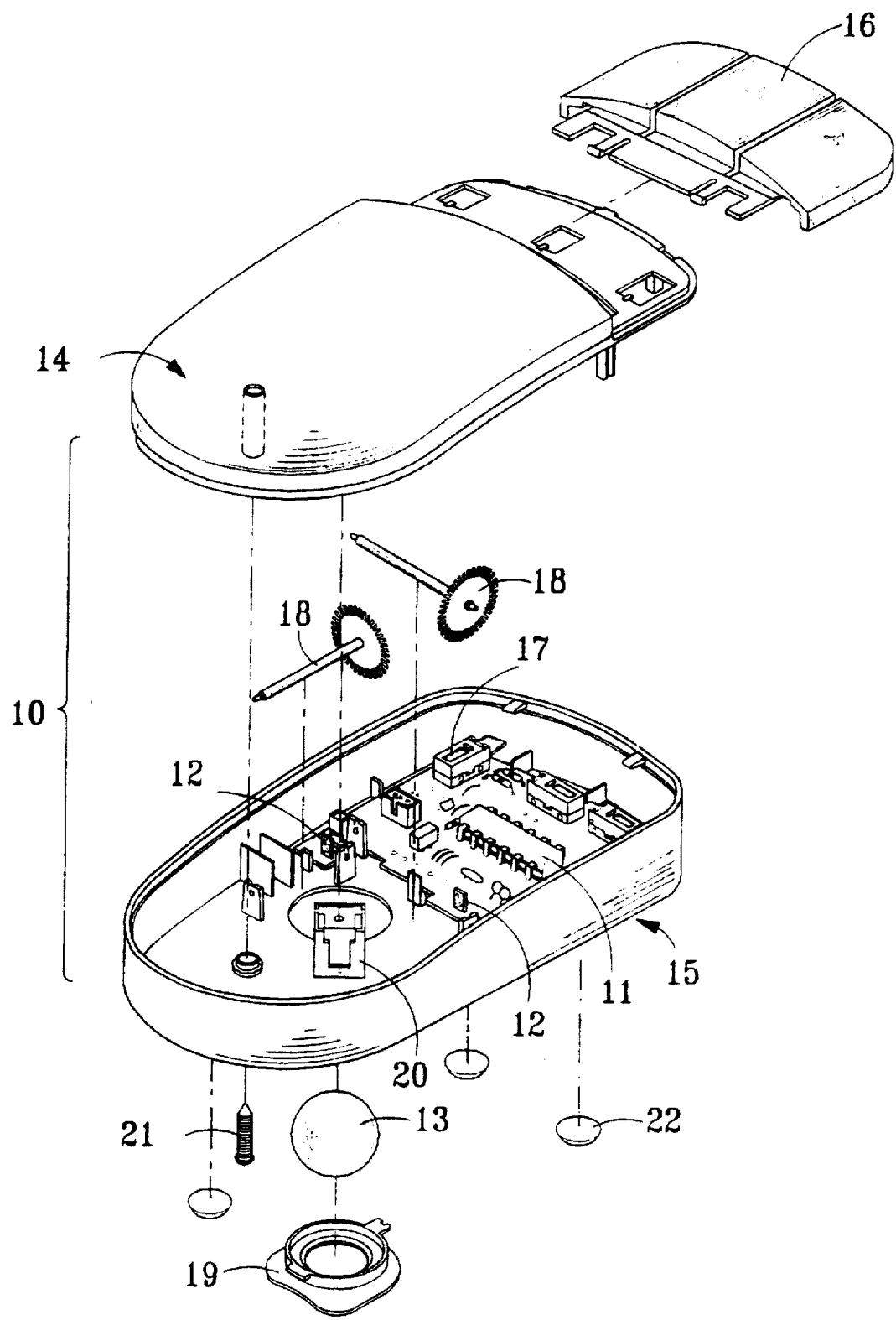
FIG. 1. is an exploded view of conventional mouse.
Figure 2:
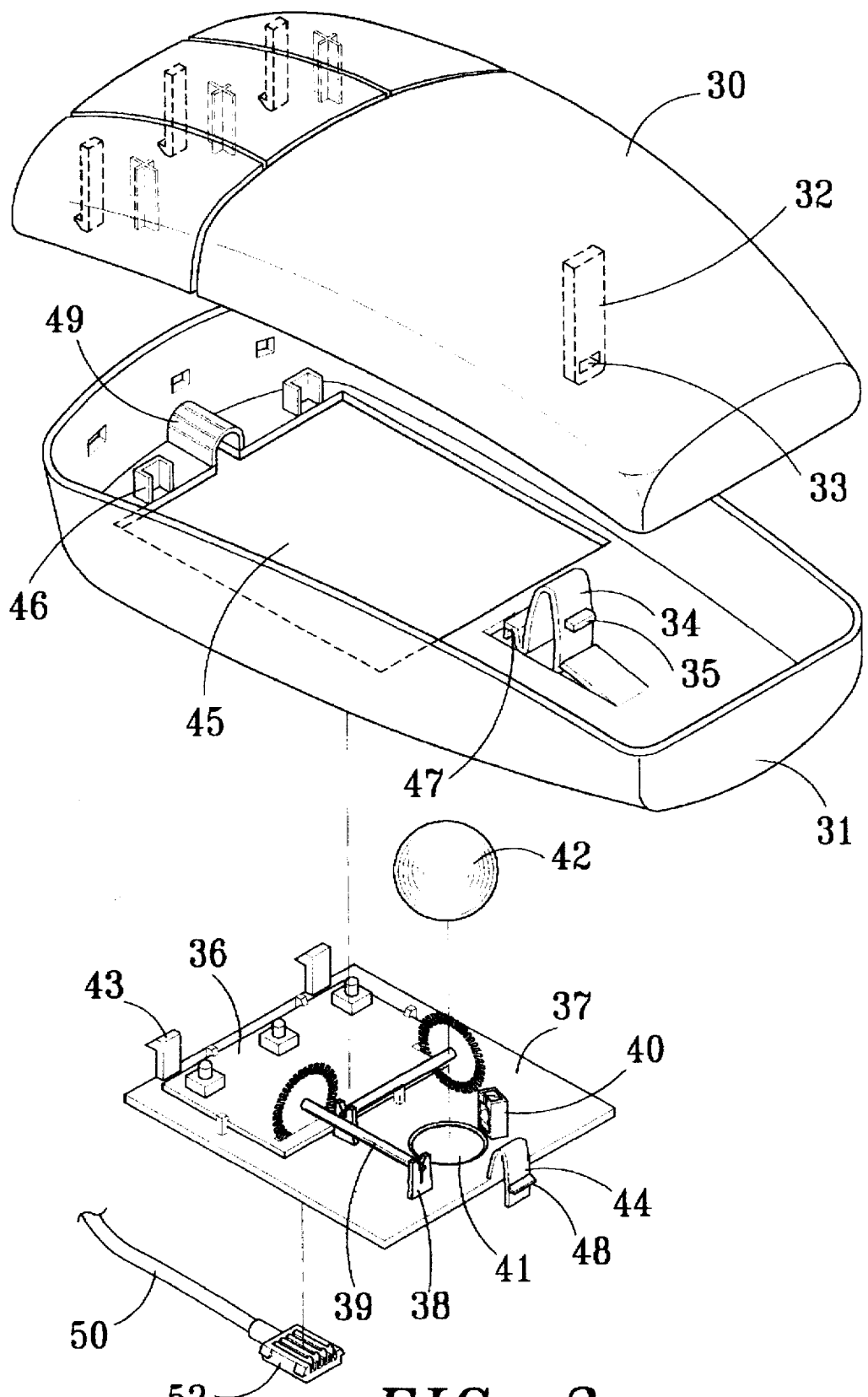
FIG. 2. is an exploded view of mechanism and case of the present invention.
Figure 3:
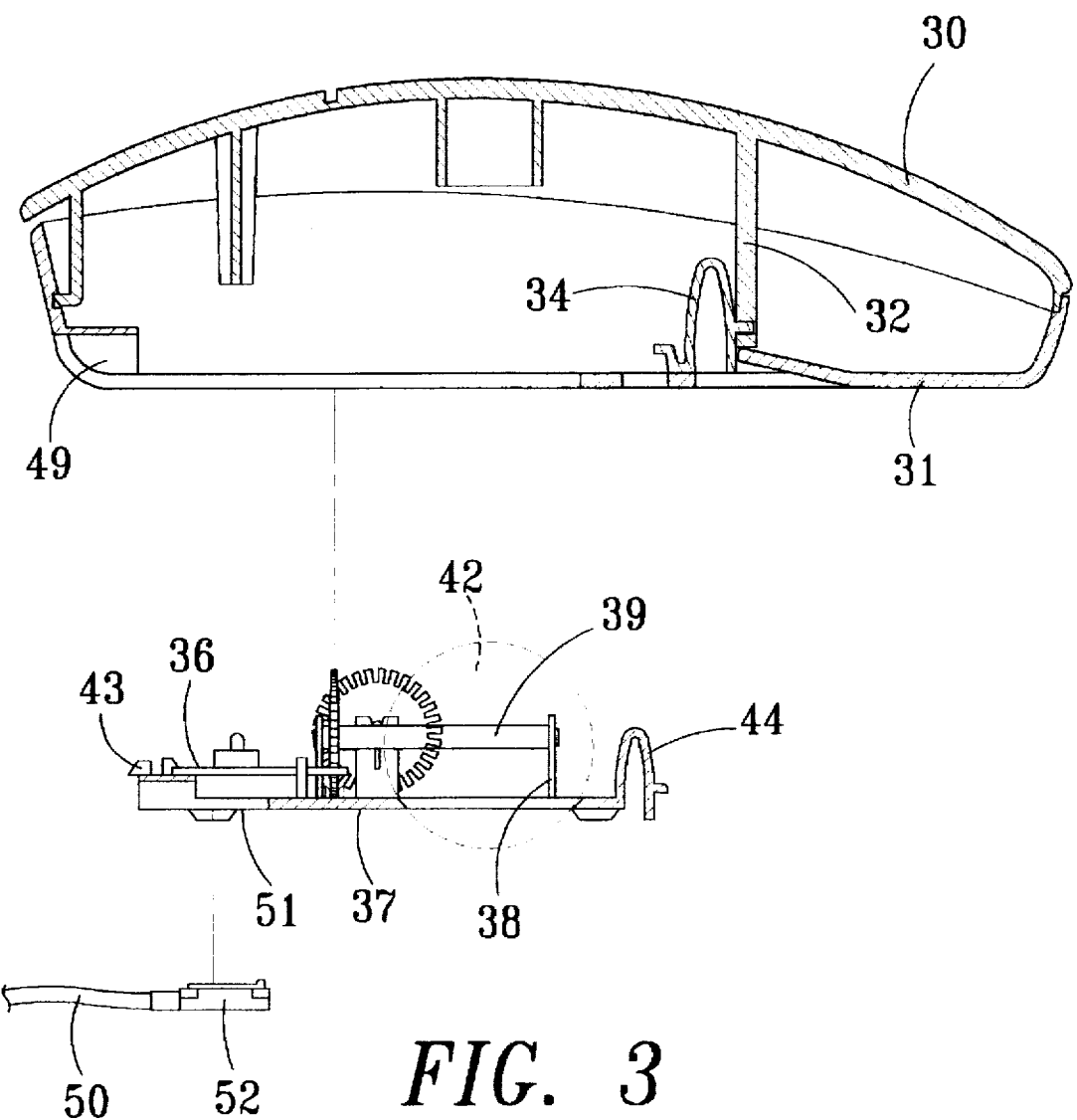
FIG. 3. is a side section view of mechanism and case of the present invention.

As shown in FIG. 2 and FIG. 3 is an exploded view of mechanism and case of the present invention and a side section view of mechanism and case. The top casing (30) and bottom casing (31) are combined by clasps without screws. The bottom of the top casing has one rectangular female clasp (32), and on the bottom of this female clasp has a hole (33) for hook up. On the bottom of bottom casing (31) has one arched spring as male clasp (34), and on the top of male clasp (34) has a protrudance (35) for hook up. When combine the top casing and bottom casing, the protrudance (35) of male clasp (34) can buckle into the hole (33) of female clasp (35). When you want to separate the top casing and bottom casing, you only need to push the male clasp (34) inward, then the protrudance (35) will depart from the hole (33).

The present invention wants to shrink the overall size of the mechanism, so all components of mouse control circuit are soldered on a PCB (36) using SMT technic, then PCB (36) is installed on a base (37). On the base (37) has two shaft supports (36) and two shafts (39); also there are one idle roller support (40) and one ball hole (41); the idle roller support can fix the position of ball member (42) to make it close to the shaft (39) tightly. The components layout of present invention of mouse mechanism is similar to the U.S. Pat. No. 5,311,209, but shrink all components on the top of base (37).

In the front of this base (37) has two hooks, and one male clasp (44) on the end which is similar to the male clasp of bottom casing (31). At the bottom of bottom casing there is an opening (45) as the same size as the base (37). At the front of base opening (45) has a hook pedestal (46) in order to fix the base (37) to the hook (43). At the end of male clasp (34) of bottom casing (31) has one clasp (47) to hook up to the protuberance (48) of the male clasp (44) of the base (37). The hook (43) of the base (37) and the male clasp(44) of the present invention are designed to hook up the base (37) to the base opening (45) on the bottom casing easily. When separate the base (37) from the bottom casing (31), only need to push the male clasp (44) inward, the protuberance (48) of the male clasp (44) will depart from the clasp (47) of the bottom casing (31) in order to achieve the structure of easy installation and easy separation. Thus, the present invention is easy for maintenance and cleaning inside of mouse.

Figure 4:
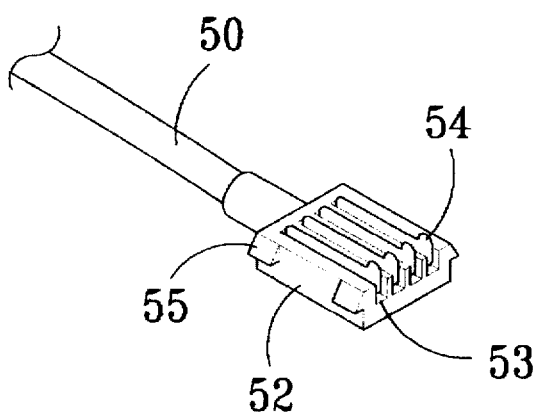
FIG. 4. is a perspective view of cable connect to the mechanism of the present invention.
Figure 5:
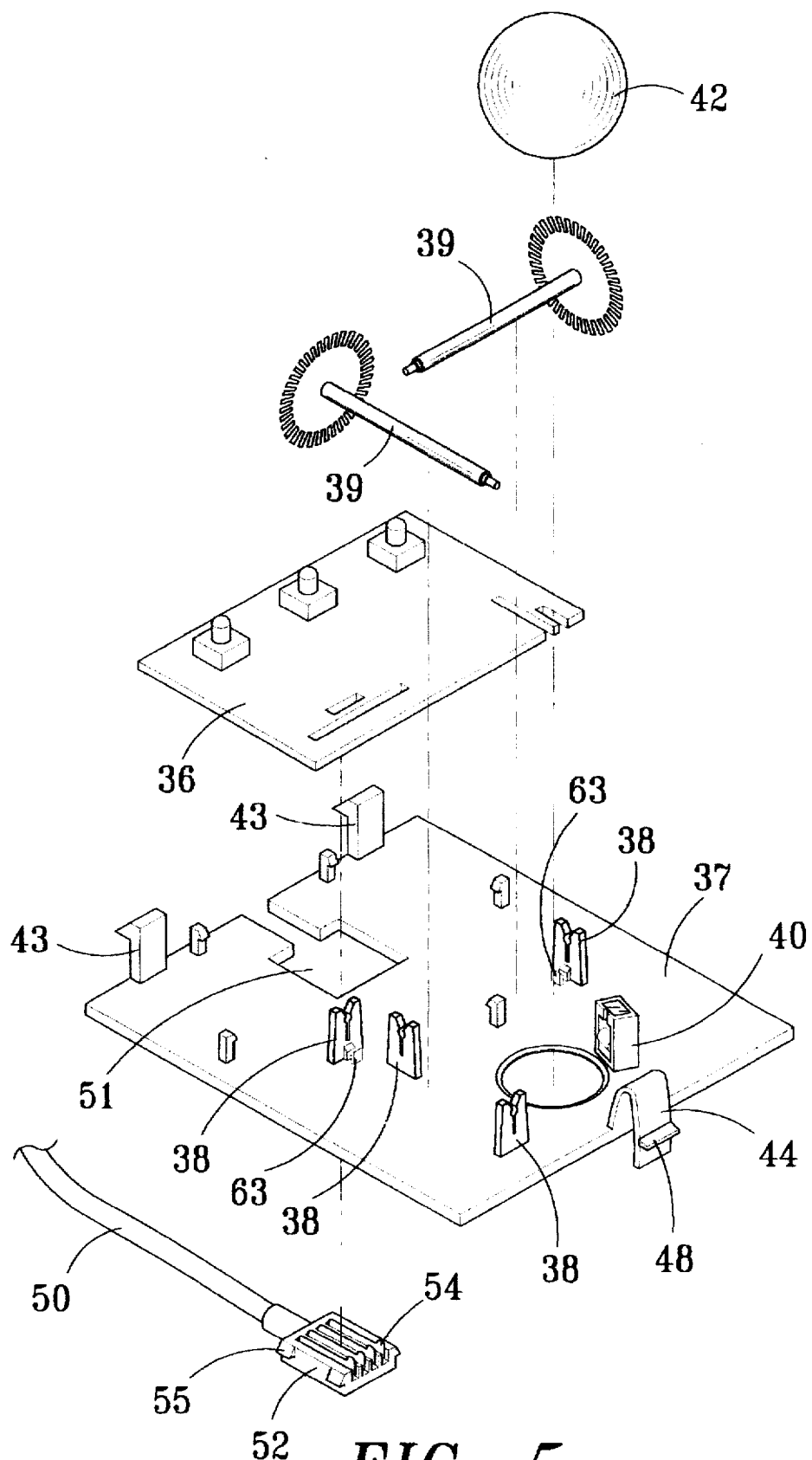
FIG. 5. is an enlarge perspective view of the mechanism of the present invention.

As shown on FIG. 4 and FIG. 5 is a perspective view of cable connect to the mechanism of the present invention and an enlarge perceptive view of the mechanism of the present invention. The mouse cable (50) of the present invention is an innovated design. The end of mouse cable (50) has a connector (52), and the top of the connector (52) has several slots (53). Each slot has a connecting spring (54), and at the end of each spring (54) has a connecting protuberance for touch to the touching point of the PCB (36). On the bottom of the base (37) has a preserve opening (51) as the same size of connector (52). The two side of connector (52) has four down hooks (55) in order to hook up to the preserve opening (51). When the connector install to the preserve opening on the bottom of base (37), the protuberance of the spring can connect to the preserve touching point is on the PCB (36) in order to be an interface for mouse and computer. On the other hand, at the center of front of bottom casing (31) has a preserve channel (49) which can put the mouse cable (50) into the mouse.

Figure 6:
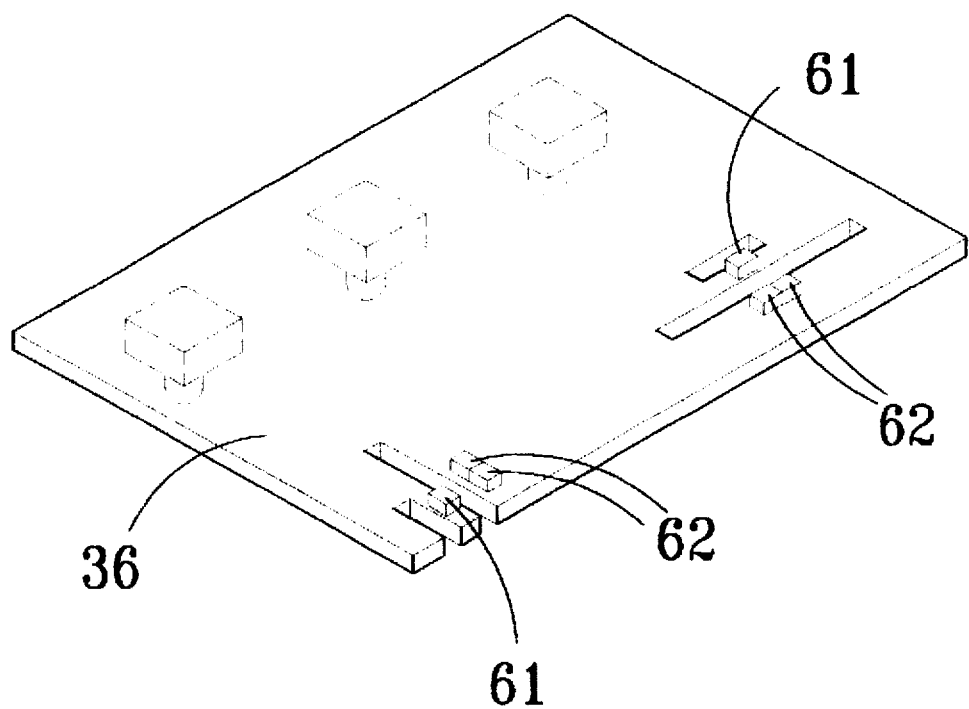
FIG. 6 is a portion diagrammatic of transmission transistor and receiving transistor of the base back of the present invention.
Figure 7:
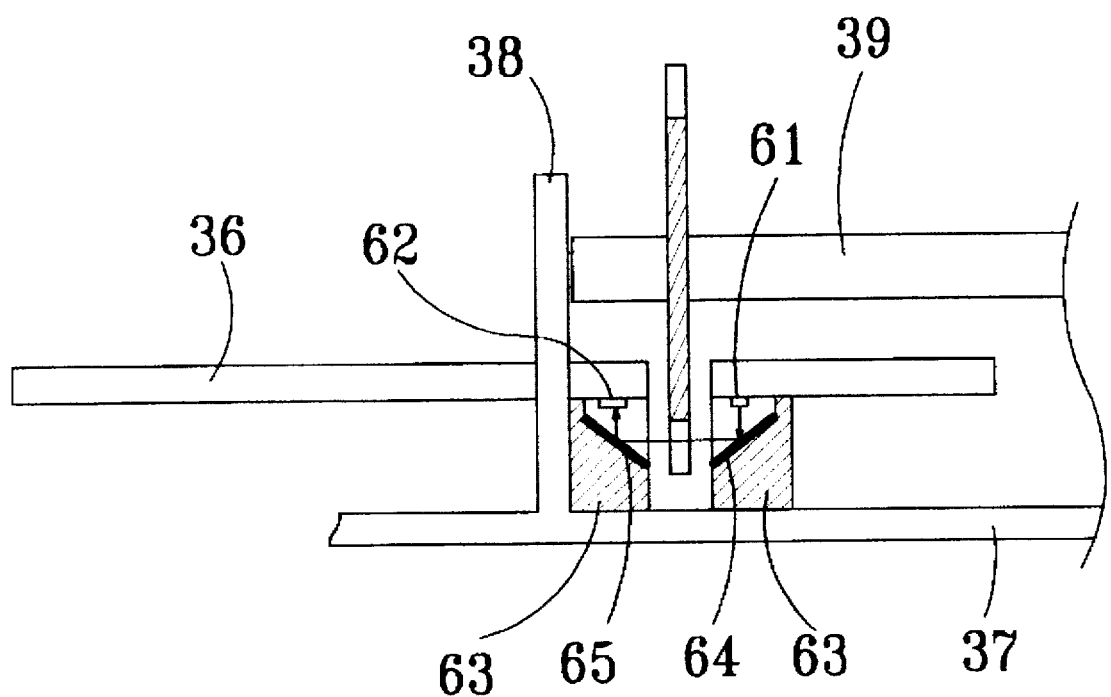
FIG. 7. is a side section view of signal transfer using optical-reflecting theory in the present invention.

Referring to FIG. 6 and FIG. 7 is a portion diagrammatic of transmission transistor and receiving transistor of the base back of the present invention and a side section view of signal transfer using optical-reflecting theory in the present invention. The mouse control circuit of the present invention use the technic of SMT to adhere all components to the back of PCB 36). Those components include two LED (61) and four phototransistors (62). The present invention use the double-chip technical theory of U.S. Pat. No. 5,311,209 as basis which the light emitted from the LED (61) to the double-chip phototransistor (62), and used the rotation of the slotted wall on the shaft (39) to shield the light in order to have double-chip phototransistor to produce a sequential 90 degrees different signals in order to control the mouse. However, the present invention shrinks all mouse components on the top of the base (37), thus the light emitted from the LED (61) can't be received through the slotted disc. Of course, shrink the size of the shaft (39) can achieve the light to penetrate the slotted wall, but the size of shaft (39) will affect the resolution of mouse, so the present invention doesn't shrink the size of the shaft (39), but design two reflecting lens (64, 65) and installs these two lens on the rack (63) in a proper slope angle for light reflection (please refer to FIG. 7). Using the theory of optical reflection, the LED (61) emit light to the reflecting lens (64), and the reflecting lens (64) reflects the light to another reflecting lens (65) through the slotted wall of the shaft (39), the reflecting lens (65) reflects the light once again to the phototransistor (62). In this way, it can reach the same encoding effect as the U.S. Pat. No. 5,311,209. At the same time, using this optical reflection theory can enlarge the shaft (39) properly increasing the resolution of mouse.

As a conclusion of the above description, the present invention is shrinking all mouse components into a base as a mouse mechanism which can be used in different designs of casing; thus it can reduce the mouse developing cost efficiently, at the same time, it makes the production of mouse more effective and makes the maintenance and cleaning of mouse easier; also it can increase the resolution of mouse.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An optical-reflecting decoder modular design for a mouse, which comprises:

a mouse case comprising a bottom casing and a top casing; a control circuit having a plurality of touching switches in a front of said mouse; a photoelectric set including two sets of light emitting diodes, and phototransistor; two slot discs; a ball member; an idle roller to prop up the ball member close to the slotted discs; and a mouse cable wherein all components of the mouse control circuit are affixed to a printed circuit board installed on a base; the base having two slotted discs, one ball member and one idle roller, an end of the base has one arched spring acting as a male clasp; a top of male clasp has a protrudance a bottom of the bottom casing has an opening the same size as the base, and a front of base opening has a hook pedestal for connection with the base, the top casing having a female clasp with a hole whereby the protrudance of the male clasp engages the hole of the female clasp to attach the top and bottom casings, which may be separated by pushing the male clasp inward to disengage the protrudance from the hole.

2. The optical-reflecting decoder modular design for a mouse according to claim 1, wherein the top casing and bottom casing are connected by clasps without any screw; on the bottom of the top casing has one rectangular female clasp, and on the bottom of this female clasp has a hole for hook up; on the bottom of bottom casing has one arched spring as male clasp, and on the top of male clasp has a protrudance for hook up; when combine the top casing and bottom casing, the protrudance of male clasp can buckle into the hole of female clasp and when separate the top casing and bottom casing, only need to push the male clasp inward, then the protrudance will depart from the hole.

3. The optical-reflecting decoder modular design for a mouse according to claim 1, wherein an end of mouse cable has a connector, and the top center of this connector has several slots, and each slot has a connecting spring, and on the end of each spring has a connecting protruberance to touch the touching point of the printed circuit board; on the bottom of the base has a preserve opening as the same size of connector; the two side of connector has four down hooks in order to hook up to the preserve opening; when the connector installs to the preserve opening on the bottom of the base, the protruberance of the spring can connect to the printed circuit board preserve touching point as the interface for mouse and computer; on the other hand, at the center of front of bottom casing has a preserve channel put the mouse cable into the mouse.

4. The optical-reflecting decoder modular design for a mouse according to claim 1, wherein said two sets of light-emitting diodes and phototransistors are adhered to a back of the printed circuit board, and installed reflecting lens under each light-emitting diode and phototransistor, and install on the rack of two lens in a slope angle for light reflection; when the light-emitting diode emit light to the reflecting lens, and the reflecting lens reflects the light to the another reflecting lens through the slotted wall of the shaft; the reflecting lens reflects the light once again to the phototransistor in order to reach encoding effect.

* * * * *